(12) United States Patent
Jiang et al.

(10) Patent No.: US 12,734,490 B2
(45) Date of Patent: Sep. 15, 2026

(54) APPARATUS AND METHOD FOR $CO_2$ MICROBUBBLE FLOODING

(71) Applicant: DALIAN UNIVERSITY OF TECHNOLOGY, Dalian (CN)

(72) Inventors: Lanlan Jiang, Dalian (CN); Yongchen Song, Dalian (CN); Kuo Li, Dalian (CN); Donglei Liu, Dalian (CN); Mingjun Yang, Dalian (CN); Yu Liu, Dalian (CN); Yi Zhang, Dalian (CN); Zheng Ling, Dalian (CN); Lei Yang, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 0 days.

(21) Appl. No.: 19/286,135

(22) Filed: Jul. 30, 2025

(65) Prior Publication Data

US 2026/0034519 A1 Feb. 5, 2026

(30) Foreign Application Priority Data

Aug. 2, 2024 (CN) ........................ 202411060394.X

(51) Int. Cl.
*B01F 23/231* (2022.01)
*B01F 23/237* (2022.01)
(Continued)

(52) U.S. Cl.
CPC ................ *B01F 23/231233* (2022.01); *B01F 23/231265* (2022.01); *B01F 23/2373* (2022.01);
(Continued)

(58) Field of Classification Search
CPC ........ B01F 23/231233; B01F 23/23762; B01F 23/2773; B01F 23/231265; B01F 35/1716;
(Continued)

(56) References Cited

U.S. PATENT DOCUMENTS 11,898,134 B2 * 2/2024 Sathe ..................... C12M 21/12
2012/0325742 A1 * 12/2012 Cumin ................... B01D 65/00 210/636
(Continued)

FOREIGN PATENT DOCUMENTS

CN 108329900 B * 11/2020 ............. C09K 8/594
CN 114113550 A * 3/2022 ............. G01N 33/28

*Primary Examiner* — Tara Schimpf
*Assistant Examiner* — Patrick F Lambe
(74) *Attorney, Agent, or Firm* — Getech Law LLC; Jun Ye

(57) ABSTRACT

A device for $CO_2$ microbubble flooding comprises a microbubble generating device, a stirring and liquid storage device, an injection pump, a gas compressor, a gas-liquid mixer and a pressure stabilizing system, wherein the microbubble generating device adopts an integrally formed multi-layer cylindrical metal powder-sintered porous plate, and the diameters of microchannels on the porous plate are sequentially reduced from inside to outside. A solution containing additives in the storage device is stirred uniformly and then enters into a downhole gas injection base pipe through the gas-liquid mixer to be injected into a stratum, then a carbon dioxide gas compressed by the gas compressor is pumped into the downhole gas injection base pipe through the gas injection pump, and the gas generates microbubbles in situ when passing through the multi-layer porous device under the action of pressure difference.

2 Claims, 2 Drawing Sheets

(51) Int. Cl.

*B01F 23/2373* (2022.01)
*B01F 35/71* (2022.01)
*C09K 8/584* (2006.01)
*C09K 8/588* (2006.01)
*C09K 8/594* (2006.01)
*E21B 41/00* (2006.01)
*E21B 43/16* (2006.01)
*B01F 101/49* (2022.01)

(52) U.S. Cl.

CPC ...... *B01F 23/23762* (2022.01); *B01F 35/712* (2022.01); *B01F 35/7176* (2022.01); *C09K 8/584* (2013.01); *C09K 8/588* (2013.01); *C09K 8/594* (2013.01); *E21B 41/0064* (2013.01); *E21B 43/164* (2013.01); *B01F 2101/49* (2022.01); *B01F 2215/0431* (2013.01)

(58) Field of Classification Search

CPC ................ B01F 35/712; B01F 2101/49; B01F 2215/0431; C09K 8/584; C09K 8/588; C09K 8/594; E21B 41/0064; E21B 43/164

USPC ....................................................... 166/305.1

See application file for complete search history.

(56) References Cited

U.S. PATENT DOCUMENTS

2022/0234012 A1* 7/2022 Castan ................... C12M 23/14
2024/0042398 A1* 2/2024 Maher ................... B01F 35/513

* cited by examiner

APPARATUS AND METHOD FOR $CO_2$ MICROBUBBLE FLOODING

TECHNICAL FIELD

The present disclosure belongs to the field of carbon capture, utilization and storage, and relates to an apparatus and a method for generating $CO_2$ microbubbles and promoting flooding.

BACKGROUND

A carbon capture, utilization and storage (CCUS) technology is considered as an effective method for globally alleviating carbon dioxide crisis. The technology aims to capture carbon dioxide from combustion processes of industrial and power plants and then store the captured carbon dioxide in safe areas (e.g., depleted oil and gas reservoirs, unexplored coal seams and deep brine aquifers) to prevent it from reaching the atmosphere.

In a comprehensive view, a carbon dioxide flooding method not only can utilize the dissolution of $CO_2$ to change physical characteristics of oil, expand the volume of oil and reduce the viscosity of oil and increase the fluidity of oil, but also can meet the needs of relieving global serious environmental problems caused by current $CO_2$ emission, and therefore the carbon dioxide flooding method has a good application prospect. However, in a field experiment, the carbon dioxide flooding method has the problems of efficient injection difficulty and poor flooding effect. After research, it has been found that viscous fingering, fluid channeling and reservoir heterogeneity are primary causes for poor oilfield performance. It is generally considered that microbubbles having diameters being within 10 to 100 μm are called as microbubbles. Different from the traditional bubble, a shell of the microbubble is composed of three layers of surface-active substances which are an inner layer, a viscous layer and an outer layer respectively. By virtue of the characteristics of large specific surface area, good stability and the like, the $CO_2$ microbubbles receive a continuously increased resistance when being injected into a porous medium so as to effectively block a porous medium, change the flow direction of the subsequent flow and expand a sweep coefficient, and therefore the $CO_2$ microbubbles gradually become an important content for geological storage, mineralization and other researches.

Nowadays, there are a few of applications for cutting and foaming of a gas under the action of the interior and exterior pressure difference of a membrane by utilizing the porosity of a material. In the past, there are applications for precipitation of a gas from a membrane in a way of fine bubbles under the action of the interior and exterior pressure difference of the membrane by utilizing the good stable usability and durable usability and excellent foaming characteristic of a single-layer sheet-like ceramic membrane. Such the single-layer sheet-like ceramic membrane has the advantages of high-pressure resistance, good corrosion resistance and uniform microbubble size. However, such the single-layer sheet-like ceramic membrane is difficult to use in practical engineering for the reasons that and first, the microbubbles are generated at the bottom of a well in a single direction, with low sweep efficiency; second, the single-layer sheet-like ceramic membrane is difficult to detach and clean because such the single-layer sheet-like ceramic membrane is generally embedded into a pipeline, such that how to detach it after use becomes a problem; and in addition, the single-layer sheet-like ceramic membrane cannot regulate and control the size of the microbubbles, in other words, the pore size of this ceramic membrane material is fixed when being formed, that is to say, the size of the microbubbles is fixed and cannot be adjusted.

SUMMARY

In order to solve the problems in the existing technology, a microbubble generating device formed by an integrated multi-layer annulus columnar metal powder-sintered porous plate is designed in consideration of material fabricating difficulty, so as to realize a scheme for microbubble carbon dioxide flooding.

The present disclosure provides an apparatus and a method for generating $CO_2$ microbubbles and promoting the flooding. The technical solution provided by the present disclosure is as follows:

Provided is an apparatus for $CO_2$ microbubble flooding, including a liquid flow path, a gas flow path and a microbubble generating device, where the liquid flow path is connected to a first passage of a gas-liquid mixer through an injection pump by adopting a stirring and liquid storage device, the gas flow path is connected to a second passage of the gas-liquid mixer by adopting a gas compressor and a pressure stabilizing system, and a third passage of the gas-liquid mixer is connected to a threaded connection port of the microbubble generating device;

- the microbubble generating device adopts a metal powder-sintered integrated multilayer cylindrical arc-shaped porous plate, an inner layer porous plate, a middle layer porous plate and an outer layer porous plate are sequentially arranged from inside to outside, a diameter of a microchannel on the outer layer porous plate are smaller than 0.5 μm, a diameter of a microchannel on the middle layer porous plate are smaller than 2 μm, and a diameter of a microchannel on the inner layer porous plate are smaller than 3 μm.

Provided is a working method of an apparatus for $CO_2$ microbubble flooding, including the following steps:

- S1, injecting an aqueous solution containing xanthan gum and sodium dodecyl sulfate into a liquid storage tank, and then stirring at a speed of 500 r/min-1000 r/min for at least two hours, where the foregoing uniformly stirred solution is used as a base solution including 3% of xanthan gum and 0.05% of sodium dodecyl sulphate;
- S2, injecting the stirred base solution into a gas-liquid mixer (3) at a certain flow rate through an injection pump and injecting the base solution into a stratum to allow a base solution to saturate a bubble generating structure and the stratum around a wellhead in advance so as to provide a proper environment for subsequently injecting a $CO_2$ gas and generating stable microbubbles;
- S3, pumping the carbon dioxide gas compressed by the gas compressor (4) into the gas-liquid mixer (3) through a gas injection pump at a pressure of 4 MPa; and
- S4, enabling the gas to pass through a three-layer metal-sintered porous plate under the action of pressure difference to generate microbubbles in situ; and after the microbubbles enter into the stratum, a Jamin effect is generated, and larger bubbles block a macroporous throat such that a flow direction of follow-up flow changes, the base solution for flooding is capable of entering into small pores, thereby storing carbon dioxide in the stratum while completing the flooding.

Compared with the existing technology, the present disclosure has the beneficial effects that:

(1) The apparatus adopts the integrated multilayer metal powder-sintered porous plate to produce the $CO_2$ microbubbles, which can realize carbon storage while improving the rate of oil and gas recovery. Compared with an apparatus for generating microbubbles by using a single-layer ceramic membrane, by using the device of the present disclosure, the diameter of the microbubbles increases to a certain extent, but is close to that of microbubbles generated by the device by using the single-layer ceramic membrane in size, however, the amount of the microbubbles generated by the device of the present disclosure greatly increases, and the device of the present disclosure has improved flooding effect to a certain extent.

(2) The microbubble carbon dioxide can minimize free $CO_2$. Compared with a single-layer sintered metal porous plate, the diameter of the microbubble is reduced by 29.88%, which reduces the potential risk of downhole $CO_2$ leakage, and facilitates the long-term safety of large-scale $CO_2$ storage.

(3) The microbubble generating device adopts an integrated structure to form a multilayer cylindrical structure, such that damages such as falling do not easily occur in practical application processes. The column end is similar to a ceramic porous plate, but is vertically placed with a 360-degree orientation and a wider sweep range. The bottom end is an arc-shaped porous plate so as to improve overall pressure resistance, and meanwhile, there are more microbubble generating directions and more uniform microbubbles to result in a larger sweep range and difficultly formed dead end, thereby creating a better microbubble effect.

(4) Compared with the single-layer ceramic membrane which can only generate microbubbles in a single direction, the cylindrical metal-sintered porous plate can generate a greater number of microbubbles and more comprehensive microbubble carbon dioxide, thereby generating no displacement dead angles, and greatly improving the sweep range.

(5) The injection of the microbubble carbon dioxide can effectively utilize the pore space in the reservoir to enhance the comprehensive effect of dissolution, reduce the viscosity of the oil reservoir, fully exert the blocking effect of the $CO_2$ microbubbles and improve the flooding environment of the reservoir.

(6) Compared with normal $CO_2$ injection, in the present disclosure, a greater amount of carbon dioxide in the same reservoir can be stored, so as to realize high-quality storage of $CO_2$ and realize economic benefits in higher recovery efficiency.

In the figure: 1, stirring and liquid storage device; 2, injection pump; 3, gas-liquid mixer; 4, gas compressor; 5, microbubble generating device; 5*a*, inner layer porous plate; 5*b*, middle layer porous plate; 5*c*, outer layer porous plate; 5*d*, threaded connection port; 6, pressure stabilizing system.

DESCRIPTION OF THE EMBODIMENTS

An experimental apparatus for generating $CO_2$ microbubbles and promoting the flooding includes a microbubble generating device, a stirring and liquid storage device, a gas injection pump, a gas compressor, a gas-liquid mixer and an oil recovery system. A multi-layer porous plate in the microbubble generating device is formed by sintering metal powders, a diameter of a microchannel on an outer layer porous plate is smaller than 0.5 μm, a diameter of a microchannel on a middle layer porous plate is smaller than 2 μm, a diameter of a microchannel on an inner layer porous plate is smaller than 3 μm, and a wall thickness of each layer porous plate is 3 mm. The multi-layer porous plate is fixed through a stainless-steel structure and connected with a gas injection end through a thread structure.

The experimental method for generating $CO_2$ microbubbles and promoting the flooding includes the following steps that a solution containing additives in a stirring and liquid storage device was uniformly stirred and then entered into a downhole gas injection base pipe through a gas-liquid mixer and injected into the stratum, and subsequently a carbon dioxide gas compressed by a gas compressor was pumped into the downhole gas injection base pipe through a gas injection pump such that the gas generated microbubbles in situ when passing through the multi-layer porous plate under the action of pressure difference, thereby storing carbon dioxide in the stratum while promoting the flooding.

Figure 1:
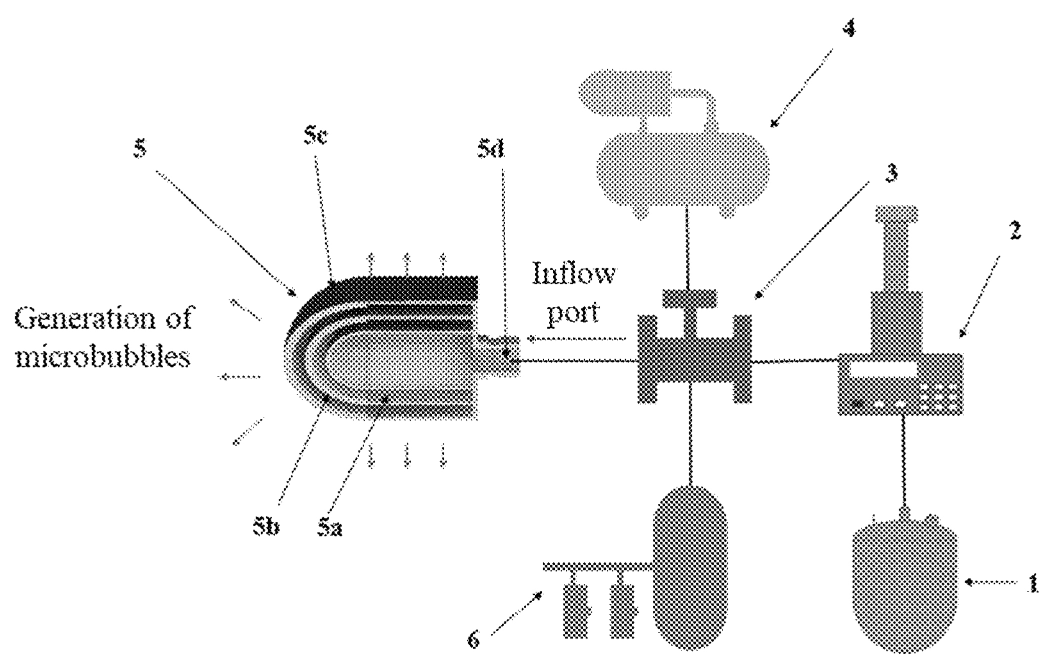
FIG. 1 is a schematic diagram of an experimental system.
Figure 2:
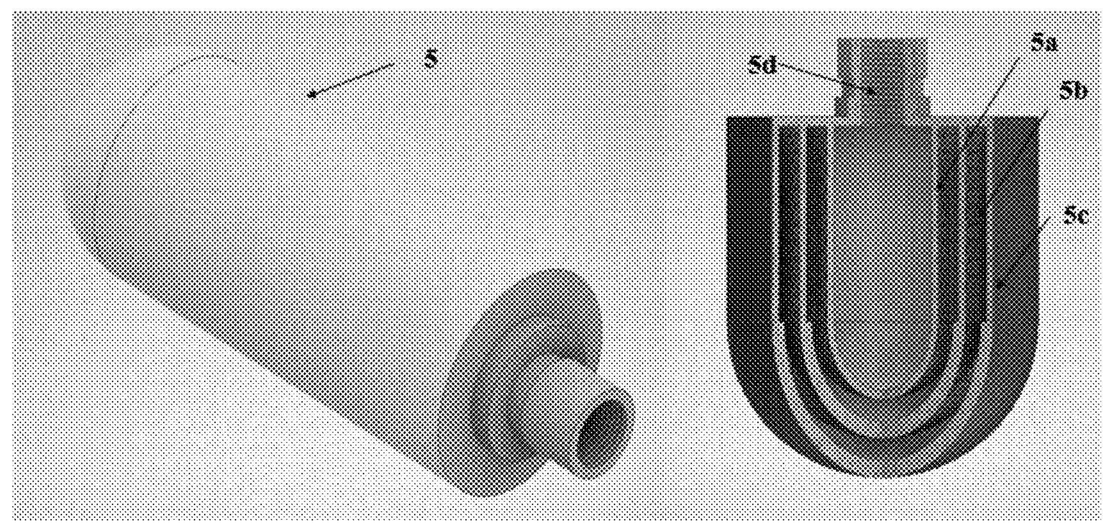
FIG. 2 is a structural diagram of a microbubble generating device.
Figure 3:
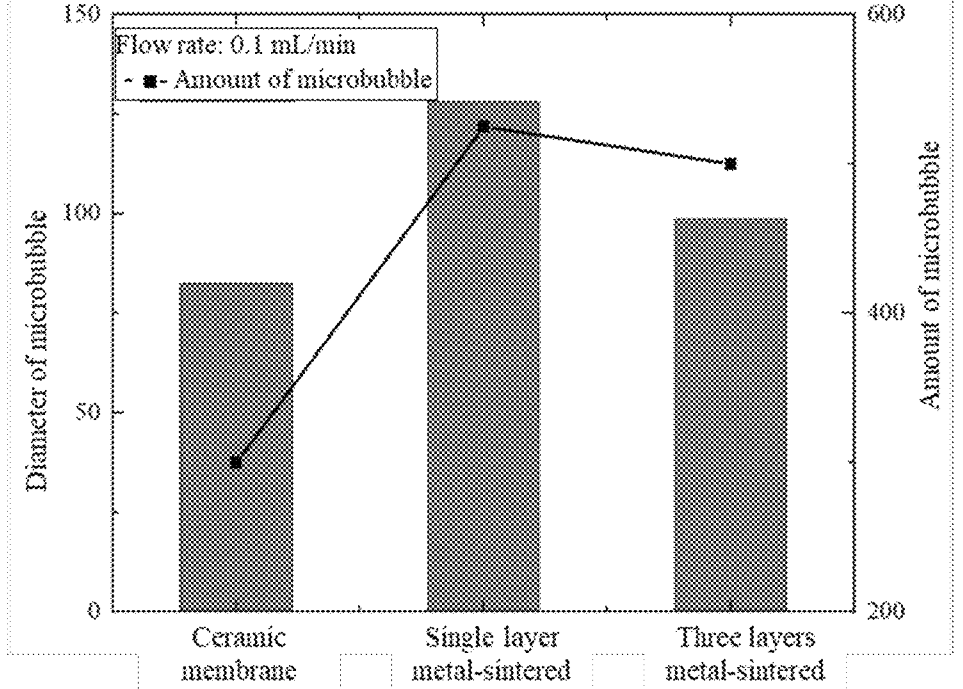
FIG. 3 is a diameter comparison diagram of microbubbles generated by microbubble generating device.

Specifically, as shown in FIG. 1, a process system in this example includes a microbubble generating device, a stirring and liquid storage device, a gas injection pump, a gas compressor and a gas-liquid mixer. The apparatus includes a liquid flow path, a gas flow path and the microbubble generating device 5, where the liquid flow path is connected to a first passage of the gas-liquid mixer 3 via the injection pump 2 by adopting the stirring and liquid storage device 1, the gas flow path is connected to a second passage of the gas-liquid mixer 3 by adopting the gas compressor 4 and the pressure stabilizing system 6, and a third passage of the gas-liquid mixer 3 is connected to a threaded connection port 5*d* of the microbubble generating device 5; and the microbubble generating device 5 is provided with an inner layer porous plate 5*a*, a middle layer porous plate 5*b* and an outer layer porous plate 5*c* from inside to outside, the diameter of the microchannel on the outer layer porous plate 5*c* is smaller than 0.5 μm, the diameter of the microchannel on the middle layer porous plate 5*b* is smaller than 2 μm, and the diameter of the microchannel on the inner layer porous plate 5*a* is smaller than 3 μm.

In this example, a method for in situ generating microbubbles in the downhole and promoting the flooding was as follows:

a solution containing additives (3% of xanthan gum and 0.05% of sodium dodecyl sulfate) was injected into a liquid storage tank, and stirred at a speed of 500 r/min for at least two hours until the solution was uniformly stirred to obtain a base solution;

subsequently, the stirred base solution was injected into a gas-liquid mixer at a certain flow rate through a pump and pumped into the stratum to saturate a bubble generating structure and the stratum around a wellhead in advance; a carbon dioxide gas compressed by a gas compressor was pumped into a gas-liquid mixer by a gas injection pump at a pressure of 4 MPa, and the gas passed through a three-layer metal-sintered porous plate under the action of pressure difference to generate microbubbles in situ, where a pore diameter of the outermost layer porous plate was 0.5 μm, a pore diameter of the second layer porous plate was 2 am, and a pore diameter of the innermost layer porous plate was 3 μm; after the microbubbles entered into the stratum, a Jamin effect was generated, and larger bubbles blocked a macroporous throat, such that a flow direction of follow-up flow changed, and the base solution for flooding was capable of entering into small pores, with an improved flooding sweep rate, thereby storing carbon dioxide in the stratum while flooding. The simulation result showed that through $CO_2$ microbubble flooding, the dissolution rate of $CO_2$ was improved by 18.7%, the injection speed and injection amount of $CO_2$ were improved, the recovery efficiency of crude oil was finally improved by 16.7%, and the displacement advantage of microbubbles $CO_2$ in a rock core was superior to that of the conventional $CO_2$. Therefore, the injection of microbubbles $CO_2$ is a promising technology for enhancing oil recovery efficiency and geological carbon fixation.

What is claimed is:

1. An apparatus for CO2 microbubble flooding, comprising a liquid flow path, a gas flow path and a microbubble generating device (5), wherein the liquid flow path is connected to a first passage of a gas-liquid mixer (3) through an injection pump (2) by adopting a stirring and liquid storage device (1), the gas flow path is connected to a second passage of the gas-liquid mixer (3) by adopting a gas compressor (4) and a pressure stabilizing system (6), and a third passage of the gas-liquid mixer (3) is connected to a threaded connection port (5*d*) of the microbubble generating device (5); and the microbubble generating device (5) adopts a metal powder-sintered integrated multilayer cylindrical arc-shaped porous plate, the metal powder-sintered integrated multilayer cylindrical arc-shaped porous plate includes an inner layer porous plate (5*a*), a middle layer porous plate (5*b*) and an outer layer porous plate (5*c*), the inner layer porous plate (5*a*), the middle layer porous plate (5*b*) and the outer layer porous plate (5*c*) are sequentially arranged from inside to outside, a diameter of a microchannel on the outer layer porous plate (5*c*) is smaller than 0.5 μm, a diameter of a microchannel on the middle layer porous plate (5*b*) is smaller than 2 μm, a diameter of a microchannel on the inner layer porous plate (5*a*) is smaller than 3 μm, and the metal powder-sintered integrated multilayer cylindrical arc-shaped porous plate is fixed through a stainless-steel structure and connected with an inflow port of the gas-liquid mixer (3) through a thread structure.

2. A method for using an apparatus for CO2 microbubble flooding, wherein the apparatus comprises:

a liquid flow path, a gas flow path and a microbubble generating device (5), wherein the liquid flow path is connected to a first passage of a gas-liquid mixer (3) through an injection pump (2) by adopting a stirring and liquid storage device (1), the gas flow path is connected to a second passage of the gas-liquid mixer (3) by adopting a gas compressor (4) and a pressure stabilizing system (6), and a third passage of the gas-liquid mixer (3) is connected to a threaded connection port (5*d*) of the microbubble generating device (5), the microbubble generating device (5) adopts a metal powder-sintered integrated multilayer cylindrical arc-shaped porous plate, the metal powder-sintered integrated multilayer cylindrical arc-shaped porous plate includes an inner layer porous plate (5*a*), a middle layer porous plate (5*b*) and an outer layer porous plate (5*c*), the inner layer porous plate (5*a*), the middle layer porous plate (5*b*) and the outer layer porous plate (5*c*) are sequentially arranged from inside to outside, a diameter of a microchannel on the outer layer porous plate (5*c*) is smaller than 0.5 μm, a diameter of a microchannel on the middle layer porous plate (5*b*) is smaller than 2 μm, a diameter of a microchannel on the inner layer porous plate (5*a*) is smaller than 3 μm, and the metal powder-sintered integrated multilayer cylindrical arc-shaped porous plate is fixed through a stainless-steel structure and connected with an inflow port of the gas-liquid mixer (3) through a thread structure, and the method comprises the steps of:

S1, injecting an aqueous solution containing xanthan gum and sodium dodecyl sulfate into a liquid storage tank, and then stirring at a speed of 500 r/min-1000 r/min for at least two hours, wherein the foregoing uniformly stirred solution is used as a base solution comprising 3% of xanthan gum and 0.05% of sodium dodecyl sulfate;

S2, injecting stirred base solution into a gas-liquid mixer (3) at a certain flow rate through an injection pump and pumping the base solution into a stratum to allow the base solution to saturate a bubble generating structure and the stratum around a wellhead in advance so as to provide a proper environment for subsequently injecting a CO2 gas and generating stable microbubbles;

S3, pumping the carbon dioxide gas compressed by a gas compressor (4) into the gas-liquid mixer (3) through a gas injection pump at a pressure of 4 MPa; and S4, enabling the gas to pass through a three-layer metal-sintered porous plate under the action of pressure difference to generate microbubbles in situ; and after the microbubbles enter into the stratum, a Jamin effect is generated, and larger bubbles block a macroporous throat such that a flow direction of follow-up flow changes, the base solution for flooding is capable of entering into small pores, with an increased flooding sweep rate, thereby storing carbon dioxide in the stratum while completing the flooding.

* * * * *